(12) United States Patent
Shmilovich et al.

(10) Patent No.: US 9,511,849 B2
(45) Date of Patent: Dec. 6, 2016

(54) FLUIDIC TRAVERSE ACTUATOR

(71) Applicant: The Boeing Company, Chicago, IL (US)

(72) Inventors: Arvin Shmilovich, Huntington Beach, CA (US); Steven Richard Kent, Downey, CA (US)

(73) Assignee: The Boeing Company, Chicago, IL (US)

( * ) Notice: Subject to any disclaimer, the term of this patent is extended or adjusted under 35 U.S.C. 154(b) by 987 days.

(21) Appl. No.: 13/662,466

(22) Filed: Oct. 27, 2012

(65) Prior Publication Data
US 2014/0119878 A1     May 1, 2014

(51) Int. Cl.
*F03B 3/12* (2006.01)
*B64C 21/04* (2006.01)

(52) U.S. Cl.
CPC ........... *B64C 21/04* (2013.01); *B64C 2230/04* (2013.01); *Y02T 50/166* (2013.01); *Y10T 29/4932* (2015.01)

(58) Field of Classification Search
CPC .. B64C 21/04; B64C 2230/04; B64C 2230/06; F05B 2240/2212; F05B 2250/311
USPC .......................................... 415/914; 433/120
See application file for complete search history.

(56) References Cited

U.S. PATENT DOCUMENTS

| | | | |
|---|---|---|---|
| 4,453,919 A * | 6/1984 | Takeshita | ................ B06B 1/186 433/120 |
| 5,875,627 A | 3/1999 | Jeswine | |
| 8,016,244 B2 | 9/2011 | Shmilovich et al. | |
| 8,336,828 B2 * | 12/2012 | Shmilovich | ............... B64C 9/18 244/207 |
| 8,632,031 B2 * | 1/2014 | Shmilovich | ............. B64C 23/06 244/1 N |
| 8,721,333 B2 * | 5/2014 | Takashi | .................... A61C 1/05 415/904 |
| 8,827,212 B1 * | 9/2014 | Shmilovich | ............. B64C 21/08 244/207 |
| 2011/0104636 A1 | 5/2011 | Takashi et al. | |
| 2011/0108672 A1 | 5/2011 | Shmilovich et al. | |

FOREIGN PATENT DOCUMENTS

| | | |
|---|---|---|
| BE | 358 128 A | 2/1929 |
| CN | 1190938 A | 8/1998 |
| CN | 101134504 A1 | 3/2008 |
| FR | 1 598 453 A | 7/1970 |
| WO | WO 2011/114285 A2 | 9/2011 |

OTHER PUBLICATIONS

EP 13180452.8 Extended European Search Report of European Patent Office, Nov. 5, 2013.

(Continued)

*Primary Examiner* — Gregory Anderson
*Assistant Examiner* — Jason Fountain
(74) *Attorney, Agent, or Firm* — McDonnell Boehnen Hulbert & Berghoff LLP

(57) ABSTRACT

A system and methods for a self-rotating fluidic traverse actuator are presented. A turbine rotates in response to a fluid flow, and an outer cylinder with a longitudinal slot that ejects the fluid flow. An inner cylinder rotates inside the outer cylinder in response to a rotation of the turbine and at least one helical slot of the inner cylinder ejects the fluid flow into the longitudinal slot.

20 Claims, 16 Drawing Sheets

(56) References Cited

OTHER PUBLICATIONS

English Translation of Notification of First Office Action issued in Chinese Patent Application No. 201310435010.3 dated May 24, 2016.
Office Action issued in Canadian Patent Application No. 2,823,943 dated Jun. 14, 2016.
Notification of First Office Action issued in Chinese Patent Application No. 201310435010.3 dated May 24, 2016 (English translation includes Notification of First Office Action, text of the First Office Action, and Search Report).
"Pneumatic Motor," www.wikipedia.org, as edited by Yobot Oct. 12, 2012, downloaded from https://en.wikipedia.org/w/index.php?title=Pneumatic_motor&oldid= . . . , Jul. 19, 2016, 10:25 a.m., 7 pages.
"Pneumatic Motor," www.wikipedia.org, downloaded from https://en.wikipedia.org/wiki/Pneumatic_motor, Jul. 13, 2016, 2:12 p.m., 7 pages.

\* cited by examiner (A) PERSPECTIVE VIEW (B) ACTUATOR LAYOUT

BYPASS TANGENTIAL SYSTEM

FLUIDIC TRAVERSE ACTUATOR

FIELD

Embodiments of the present disclosure relate generally to fluid-dynamic design. More particularly, embodiments of the present disclosure relate to design of a fluidic actuator.

BACKGROUND

Flow control can be used to enhance lift performance by using a fluidic source such as bleed air from an engine or a special purpose compressor. Airflow from the fluidic source is ejected out of an aircraft from across a top of wings or flaps in a general stream-wise direction. The ejected airflow imparts momentum into an air stream flow over the wings or flaps. This momentum causes the air stream flow to better follow a surface of the wing or flaps. Consequently, circulation increases around an entire wing comprising the wing or flaps, and higher lift is obtained.

However, current methods of airflow control require substantial amounts of ejected airflow to achieve meaningful design targets. Aircraft engines can be used to supply air for actuation by "bleeding" compressed air from inside the engine, but design targets require a substantial amount of bleed air. The use of engine bleed air impacts a size and efficiency of the aircraft engines. The larger the bleed air requirement, the larger and heavier the aircraft engines need to be. Larger and heavier aircraft engines lead to an increase in aircraft gross weight and aircraft engine cost. In addition, bleed requirements reduce efficiency of the aircraft engines. Alternatively, a separate air compressor can also be used in conjunction with a duct delivery system to supply the air for actuation. However, the addition of separate air compressors also leads to additional weight.

SUMMARY

A system and methods for a self-rotating fluidic traverse actuator are presented. A turbine rotates in response to a fluid flow, and an outer cylinder with a longitudinal slot ejects the fluid flow. An inner cylinder rotates inside the outer cylinder in response to a rotation of the turbine and at least one helical slot of the inner cylinder ejects the fluid flow into the longitudinal slot.

A self-rotating fluidic traverse actuator system uses a fluidic source to provide both a flow actuation and a mechanism for rotating an inner cylinder via a turbine instead of an electric motor. The self-rotating fluidic traverse actuator system uses a turbine instead of an electric motor, thereby substantially reducing implementation complexity of the self-rotating fluidic traverse actuator system. Compared to existing systems, the self-rotating fluidic traverse actuator system comprises advantages such as, but without limitation: having lower weight, not requiring a power source, substantially reducing possible non-optimal lightning conditions, simplifying an entire actuation mechanism due to fewer parts, reducing a risk of leakage, reducing maintenance, and other advantages.

In an embodiment, a self-rotating fluidic traverse actuator comprises a turbine, an outer cylinder, and an inner cylinder. The turbine rotates in response to a fluid flow, and an outer cylinder comprises a longitudinal slot that ejects the fluid flow. The inner cylinder rotates inside the outer cylinder in response to a rotation of the turbine, and comprises at least one helical slot that ejects the fluid flow into the longitudinal slot.

In another embodiment, a method for configuring a self-rotating fluidic traverse actuator configures a turbine to rotate in response to a fluid flow. The method further configures a longitudinal slot in an outer cylinder, and configures the longitudinal slot to eject the fluid flow. The method further configures at least one helical slot in an inner cylinder, and configures the inner cylinder to rotate inside the outer cylinder in response to a rotation of the turbine. The method further configures the at least one helical slot to eject the fluid flow into the longitudinal slot.

In a further embodiment, a method for operating a self-rotating fluidic traverse actuator rotates a turbine in response to a fluid flow. The method further rotates an inner cylinder comprising at least one helical slot inside an outer cylinder comprising a longitudinal slot in response to a rotation of the turbine. The method further ejects the fluid flow into the at least one helical slot, and ejects the fluid flow out the longitudinal slot.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, fluid actuation, vehicle structures, fluid dynamics, flight control systems, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, an aircraft airfoil. Embodiments of the disclosure, however, are not limited to such aircraft airfoil applications, and the techniques described herein may also be utilized in other applications. For example but without limitation, embodiments may be applicable to hydrofoils, wind turbines, tidal power turbines, or other fluid dynamic body that can travel through a fluid.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
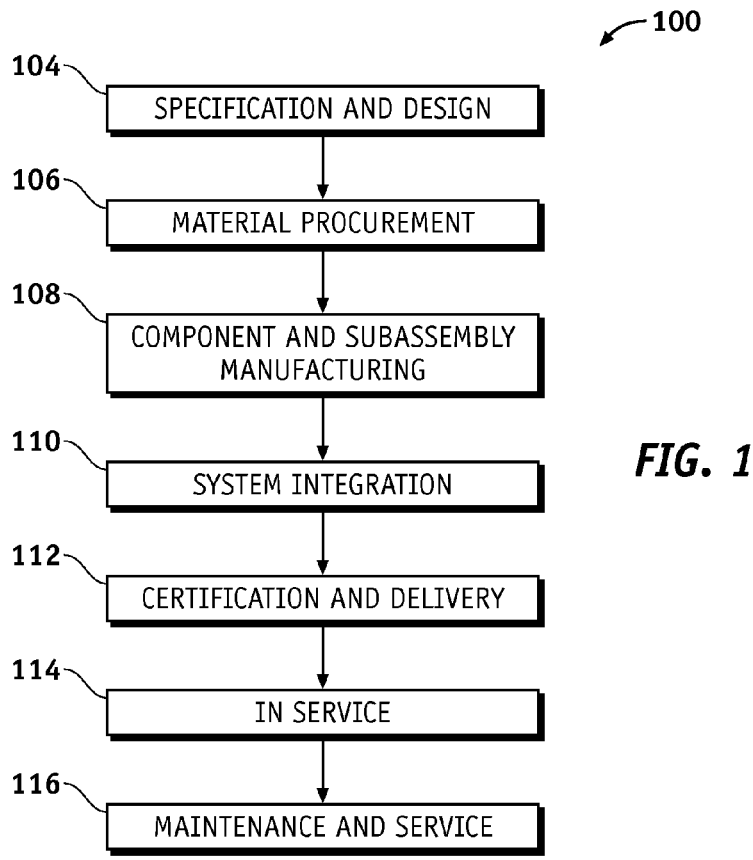
FIG. 1 is an illustration of a flow diagram of an exemplary aircraft production and service methodology.
Figure 2:
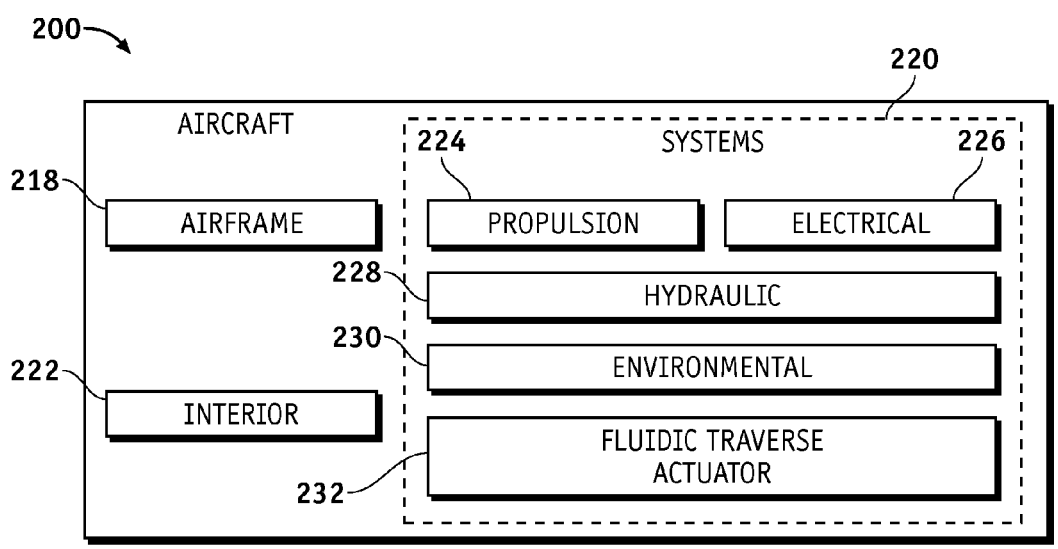
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 1, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a fluidic traverse actuator system 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
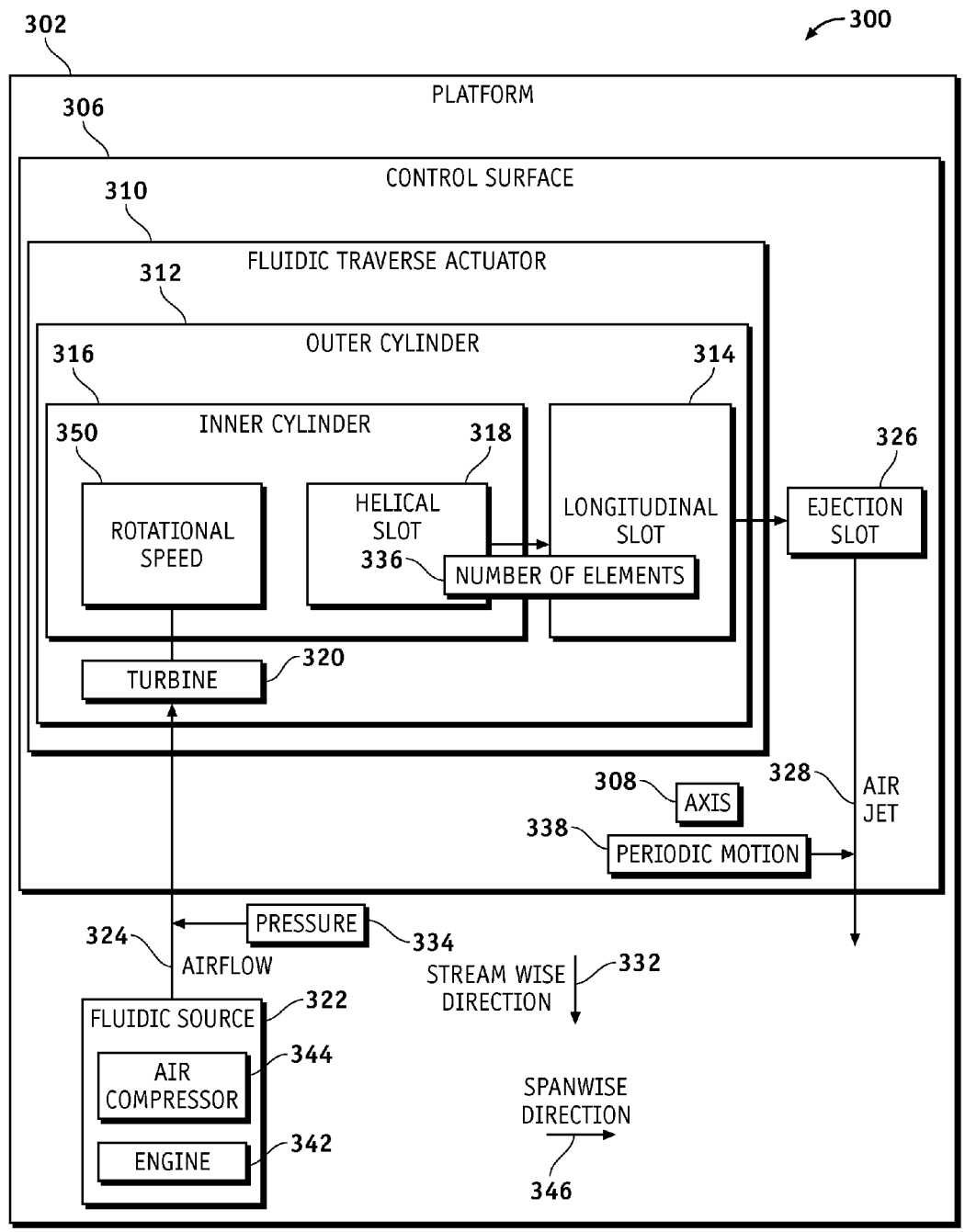
FIG. 3 is an illustration of an exemplary schematic block diagram showing a self-rotating fluidic traverse actuator system according to an embodiment of the disclosure.

FIG. 3 is an illustration of an exemplary schematic block diagram of a self-rotating fluidic traverse actuator system (system 300) according to an embodiment of the disclosure. System 300 is not meant to imply physical or architectural limitations to the manner in which different embodiments may be implemented. Other components in addition to and/or in place of the ones illustrated may be used. Some components may be unnecessary in some embodiments. Also, the blocks are presented to illustrate some functional components. One or more of these blocks may be combined and/or divided into different blocks when implemented in different embodiments.

System 300 may comprise a platform 302, a control surface 306, a fluidic traverse actuator 310, a turbine 320, and a fluidic source 322.

The platform 302 may also comprise, for example but without limitation, a piloted aircraft (e.g., a fixed wing or a rotorcraft), a ship, a boat, a submarine, a surface vehicle (e.g., an automobile), a robotic vehicle, an autonomous robotic vehicle, or other vehicle capable of moving through a fluid such as, but without limitation, water, air, or similar fluid. The platform 302 may comprise a fluid dynamic surface such as the control surface 306.

The control surface 306 may comprise, for example but without limitation, an aileron, a flap, a slat, a spoiler, an air brake, and/or other suitable control surface. In the embodiment shown in FIG. 3, the control surface 306 comprises an ejection slot 326. The ejection slot 326 comprises an opening in the control surface 306. The ejection slot 326 may extend along the control surface 306 in a span-wise direction 346. As used herein, the span-wise direction 346 is associated with a span of a control surface. For example, the span-wise direction 346 comprises a direction in which a wing extends from an aircraft fuselage. The control surface 306 comprises the fluidic traverse actuator 310 located inside the control surface 306.

In some embodiments, the control surface 306 may comprise a flap. Control surface 306 may comprise, for example but without limitation, a Krueger flap, a plain flap, a split flap, a Fowler flap, a slotted flap, a simple hinge flap and/or other suitable type of flap. Additionally, one or more of the fluidic traverse actuator 310 may be implemented in various lifting surfaces and control surfaces of the platform 302. For example, one or more of the fluidic traverse actuator 310 may be implemented in a lift surface such as a wing, or a control surface such as a horizontal stabilizer of the platform 302.

The fluidic traverse actuator 310 may comprise one or more actuation systems. For example, a number of actuation systems may be used in order to span an entire length of the control surface 306. The fluidic traverse actuator 310 comprises an outer cylinder 312 and an inner cylinder 316. The fluidic traverse actuator 310 is configured to use the fluidic source 322 to provide both flow actuation and a mechanism to rotate the turbine 320 thereby rotating the inner cylinder 316. The self-rotating fluidic traverse actuator system 300 uses the turbine 320 to actuate the fluidic traverse actuator 310, which makes implementation of the fluidic traverse actuator system 300 very simple compared to existing systems that use, for example, an electric actuator.

As mentioned above, compared to the existing systems, the turbine 320 comprises several advantages such as, but without limitation: having lower weight, not requiring a power source, substantially reducing possible non-optimal lightning conditions, simplifying an entire actuation mechanism due to fewer parts, reducing a risk of leakage, reducing maintenance, and other advantages.

The outer cylinder 312 and the inner cylinder 316 may be concentric hollow cylinders. Concentric cylinders comprise cylinders that substantially share a similar axis. A cylinder having a smaller radius can sit inside of a cylinder having a larger radius. The outer cylinder 312 is positioned along an axis 308. The axis 308 runs across with the control surface 306. The outer cylinder 312 comprises a longitudinal slot 314. The outer cylinder 312 is positioned in the control surface 306 such that the ejection slot 326 and a longitudinal slot 314 align and overlap.

The inner cylinder 316 comprises a helical slot 318. As used herein, a helical slot comprises an opening that comprises a substantially spiral form. A helical slot may be formed by slicing along a surface of a rotating cylinder. The inner cylinder 316 is placed inside the outer cylinder 312 such that inner cylinder 316 and the outer cylinder 312 share substantially a same axis, such as, for example, the axis 308. The helical slot 318 runs along an outer side of the inner cylinder 316 in a spiral fashion in a direction of the axis 308.

The helical slot 318 is formed such that a number of elements 336 of the helical slot 318 and the longitudinal slot 314 overlap. For example, the helical slot 318 may spiral around the axis 308. The helical slot 318 comprises, without limitation, substantially one or more full revolutions around the inner cylinder 316. As the inner cylinder 316 rotates, the helical slot 318 induces a periodical fluid flow sweep on a fluid dynamic surface such as the control surface 306.

The longitudinal slot 314 may extend in a same direction as the axis 308. Each time a part of the helical slot 318 and the longitudinal slot 314 intersect, they create an overlapping portion. Depending upon how tightly the helical slot 318 may spiral around the axis 308, any number of portions of the helical slot 318 and the longitudinal slot 314 may overlap.

The inner cylinder 316 and the outer cylinder 312 may be composed of various materials. For example but without limitation, the inner cylinder 316 and the outer cylinder 312 may comprise one or more material selected from at least one of: aluminum, steel, titanium, a composite material, and/or any other suitable material.

In operation, the inner cylinder 316 rotates at high frequency while the outer cylinder 312 is fixed. When an airflow 324 is supplied, a relative motion produces sets of small and fast moving air jets 328 which enhance an efficiency of flows in numerous aerodynamic applications. The fluidic source 322 is coupled to the turbine 320 which is coupled to the inner cylinder 316. During actuation the airflow 324 supplied by the fluidic source 322 provides enough torque required for rotating the turbine 320, thereby rotating the inner cylinder 316 in addition to providing the air jets 328 needed for flow control. In this document, airflow 324 and inflow 324 may be used interchangably.

The turbine 320 is coupled to the inner cylinder 316 and to the fluidic source 322. During actuation, the airflow 324 supplied by the fluidic source 322 provides enough torque necessary for rotating the inner cylinder 316, in addition to providing the air jets 328 needed for flow control without using an electric motor. The turbine 320 uses the fluidic source 322 to provide both flow actuation and a mechanism for rotating the inner cylinder 316. Integration of the turbine 320 is much simpler since it avoids a need for an electrical motor.

The turbine 320 may comprise, for example but without limitation, an axial turbine, a split turbine, a tangential turbine, a circumferential turbine, a combination manifolded axial/circumferential turbine, a helical turbine, and inward-oriented ribs running a length of the inner cylinder, or other turbine configuration as explained in more detail below.

Compared to the existing systems, using the turbine 320 instead of an electric motor comprises several advantages such as, but without limitation: having lower weight, not requiring a power source, substantially reducing possible non-optimal lightning conditions, simplifying an entire actuation mechanism due to fewer parts, reducing a risk of leakage, and reducing maintenance, and other advantages.

The fluidic source 322 sends the airflow 324 supplied by the fluidic source 322 into the turbine 320. The airflow 324 comprises a stream of air comprising a pressure 334. The airflow 324 may comprise, without limitation, a pressure greater than a relative external air pressure for a given altitude of an aircraft. A pressure difference between the airflow 324 and the external flow may substantially determine a velocity of the air jets 328. The fluidic source 322 may comprise, without limitation, a separate device included in the platform 302, such as, for example, an air compressor 344. The fluidic source 322 may also comprise, without limitation, an engine 342 of the platform 302. The platform 302 may be configured to bleed a compressed air from the engine 342 to supply the airflow 324. In the embodiment shown in FIG. 3, the airflow 324 flows outwardly through the helical slot 318 of the inner cylinder 316, and through the longitudinal slot 314 of the outer cylinder 312, then out the ejection slot 326 of the control surface 306. As the airflow 324 flows out the ejection slot 326, it exits the control surface 306 to form a jet of air, such as the air jet(s) 328.

In operation, the airflow 324 rotates the turbine 320 by creating a torque, the torque of the turbine 320 rotates the inner cylinder 316, as the inner cylinder 316 rotates an opening is formed at the number of elements 336 where the helical slot 318 momentarily overlaps with the longitudinal slot 314. The airflow 324 flows through the ejection slot 326 and into an external airflow field. The continuous rotation of the inner cylinder 316 along with the pressure 334 produces the air jet 328. As the inner cylinder 316 continues to rotate, the air jet 328 flows in a direction substantially perpendicular to an axis 308. Additionally, the rotation of the inner cylinder 316 moves the air jet 328 along the axis 308 in a periodic motion 338. Thus, the air jet 328 moves along or traverses the control surface 306 while flowing in a stream-wise direction 332 of the platform 302. The stream-wise direction generally refers to the direction that an external air flows across the surfaces of the platform 302 while flying.

As discussed above, one or more of the fluidic traverse actuator 310 may be used to span an entire length of the control surface 306. A length of the air jet 328 may be substantially determined by a length of overlap of the helical slot 318 with the longitudinal slot 314. A width of the air jet 328 may be substantially determined by a width of the longitudinal slot 314. A speed with which the air jet 328 traverses the control surface 306 may be substantially determined by a rotational speed 350 of the inner cylinder 316.

Each of the one or more of the fluidic traverse actuator 310 produces an air jet or a number of air jets over a span of the fluidic traverse actuator 310. This number of air jets may or may not be synchronized over a span of the control surface 306. Additionally, the number of jets may move across the control surface 306 from a first point to a second point then back to the first point. Alternatively, the number of jets may move across the control surface 306 just from a first point to a second point then repeat the same motion. Still yet, substantially any number of these movement patterns may be incorporated into different numbers of the fluidic traverse actuator 310 that may or may not be synchronized together.

The air jet 328 flowing perpendicular to and moving along the axis 308 results in lift increment of the platform 302. The lateral motion of the air jet 328 produces an instantaneous flow attachment in the region around the control surface 306. As the air jet 328 traverses along the control surface 306, the created effects linger. The instantaneous flow remains attached over all of control surface 306, creating a streamlining effect around the control surface 306. This streamlining effect generates greater global circulation, leading to lift augmentation of the control surface 306, while the amount of actuation required to create such augmentation is greatly reduced.

For specified air jet width and traversing speeds, the amount of airflow required to produce the same amount of lift is approximately one-eighth the amount of airflow needed for constant blowing methods.

For example, the platform 302 may take other forms. In other embodiments, the fluidic traverse actuator 310 may not include both the outer cylinder 312 and the inner cylinder 316. Rather, the inner cylinder 316 may be inserted directly into the control surface 306. In other embodiments, the inner cylinder 316 may have the longitudinal slot and be stationary, while the outer cylinder 312 has the helical slot and rotates. In other embodiments, the fluidic traverse actuator 310 may be inside a wing, a stabilizer, or some other platform component, with a configuration such as the control surface 306 as described above.

Figure 4:
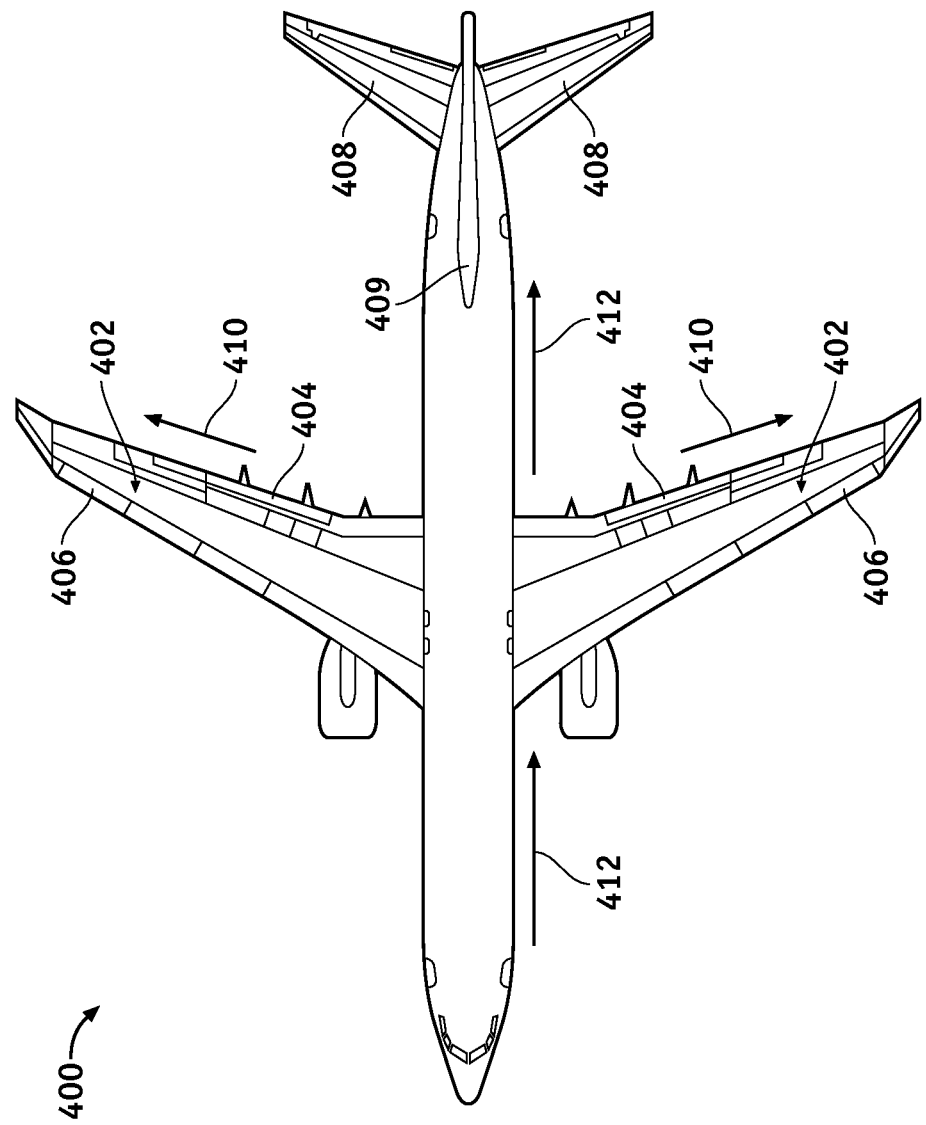
FIG. 4 is an illustration of an exemplary top view of an aircraft according to an embodiment of the disclosure.

FIG. 4 is an illustration of an exemplary top view an aircraft 400 according to an embodiment of the disclosure. The aircraft 400 is an example of one implementation of the platform 302 in FIG. 3. In the embodiment shown in FIG. 4, a number of fluidic traverse actuators, such as the fluidic traverse actuator 310 in FIG. 3, may be used in wings 402. A number of the fluidic traverse actuators 310 may also be used in flaps 404, such as shown by the control surface 306 in FIG. 3, or in leading edge slats 406. Additionally, a number of fluidic traverse actuators 310 may be used in horizontal stabilizers 408, or in the vertical stabilizer 409.

A span-wise direction 410 is shown for the wings 402. The span-wise direction 410 extends from the center of aircraft 400 in a direction of the wings 402. The span-wise direction 410 is an example of the span-wise direction 346 in FIG. 3. A stream-wise direction 412 is also shown for the aircraft 400. The stream-wise direction 412 generally refers to a direction of external air flowing across a surface of the aircraft 400 while flying. The stream-wise direction 412 is an example of the stream-wise direction 332.

Figure 5:
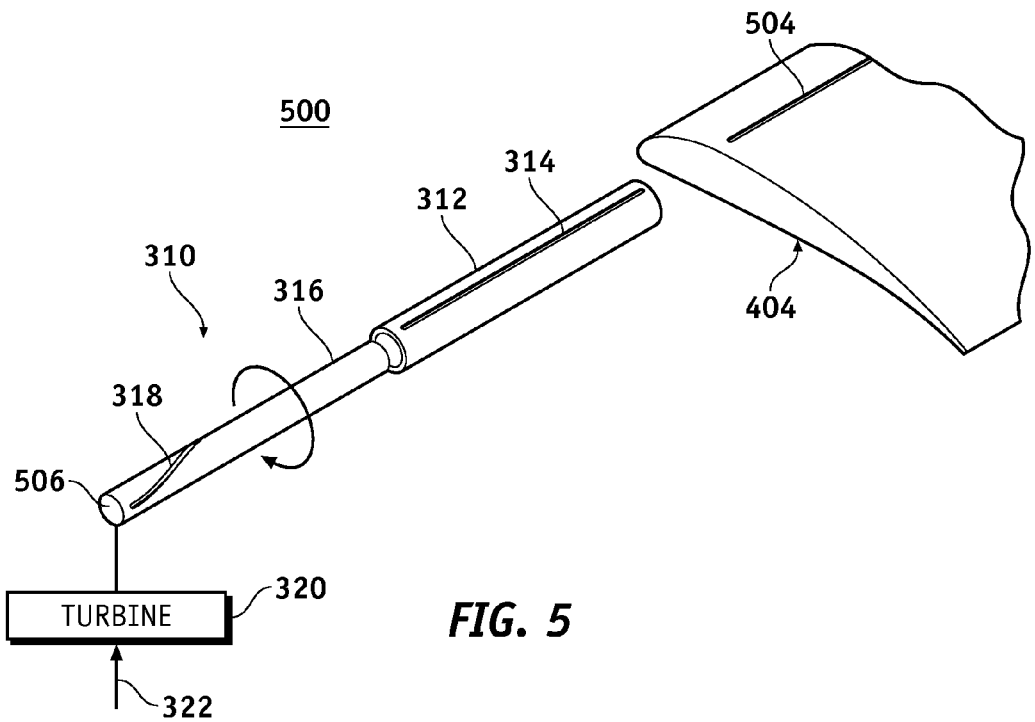
FIG. 5 is an illustration of an exemplary fluidic traverse actuator system in a flap and in a wing of an aircraft according to an embodiment of the disclosure.

FIG. 5 is an illustration of an exemplary fluidic traverse actuator system 500 showing the fluidic traverse actuator 310 prior to insertion into the flap 404 and in the wing 402 of the aircraft 400 according to an embodiment of the disclosure. The fluidic traverse actuator 310 comprises the outer cylinder 312 and inner cylinder 316. The outer cylinder 312 is inserted in the flap 404 such that a flap ejection slot 504 and the longitudinal slot 314 align and overlap. The inner cylinder 316 is inserted in the outer cylinder 312 such that only a portion of the helical slot 318 and the longitudinal slot 314 overlap. The inner cylinder 316 rotates inside of the outer cylinder 312 by action of the turbine 320 without using an electric motor as explained in more details in the context of the discussion of FIGS. 8-12.

Figure 6:
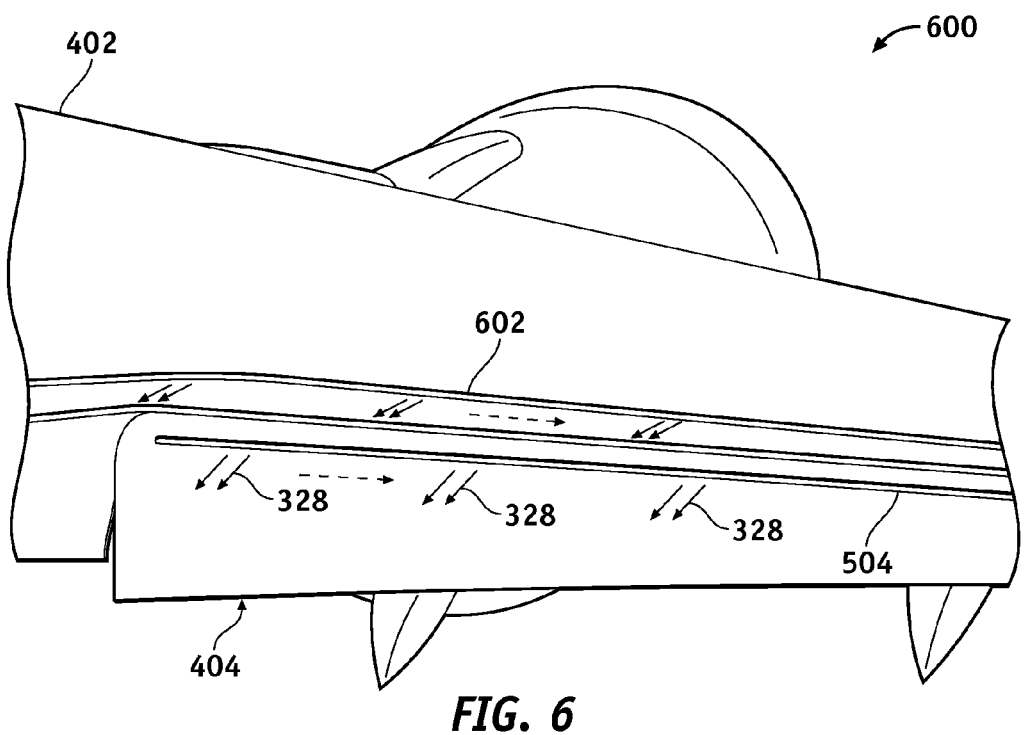
FIG. 6 is an illustration of an exemplary rear perspective view of a wing of an aircraft according to an embodiment of the disclosure.

FIG. 6 is an illustration of an exemplary rear perspective view 600 of the wing 402 of the aircraft 400 according to an embodiment of the disclosure. A number of fluidic traverse actuator such as the fluidic traverse actuator 310 in FIG. 3, are inserted into the wing 402 as well as the flap 404. Number of the air jets 328 flow in the stream-wise direction 412 out of a wing ejection slot 602 and the flap ejection slot 504 from several locations. Number of the air jets 328 move in a lateral or the span-wise direction 410.

Figure 7:
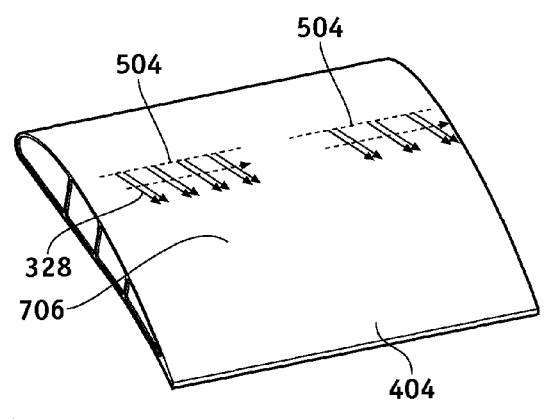
FIG. 7 is an illustration of a fluidic traverse actuator installed in a segment of a flap of a wing deployed during landing according to an embodiment of the disclosure.
Figure 7:
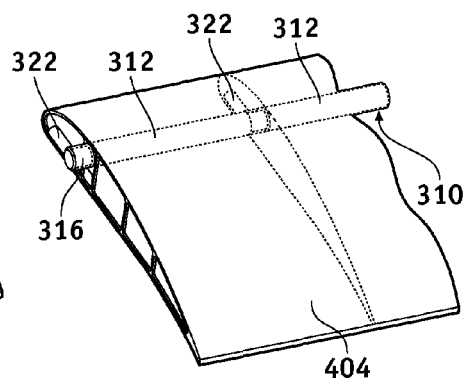

FIG. 7 is an illustration of a perspective view A and an actuator layout B of the flap 404 of the wing 402 showing fluidic traverse actuator(s) 310 installed in a segment of the flap 404 of the wing 402 deployed during landing according to an embodiment of the disclosure. The fluidic traverse actuators 310 are coupled to corresponding flap ejection slots 504 on an upper surface 706. Instantaneous jet efflux such as the air jets 328 are shown at several stations on the upper surface 706. As mentioned above, each of the fluidic traverse actuators 310 is comprised of two concentric cylindrical elements. The outer cylinder 312 is stationary and comprises the longitudinal slot 314 (see FIG. 3) which is aligned with the flap ejection slot 504. The inner cylinder 316 is a rotating element which has a set of the helical slots 318 shown in FIG. 5. High-pressure air is supplied from the fluidic source 322 to an end 506 of the inner cylinder 316 shown in FIG. 5.

As the inner cylinder 316 rotates, finite openings are formed where the helical slots 318 momentarily overlap the longitudinal slot 314 of the outer cylinder 312, thereby permitting air ejection such as the air jet 328 through the flap ejection slot 504 and into the external flow. The continuous rotation of the inner cylinder 316 effectively produces a set of the air jets 328 that traverse along the flap ejection slot 504. The inner cylinder 316 rotates inside of outer cylinder 312 by action of the turbine 320 (FIGS. 3 and 5) without using an electric motor as explained in more details in the context of the discussion of FIGS. 8-12.

Figure 8:
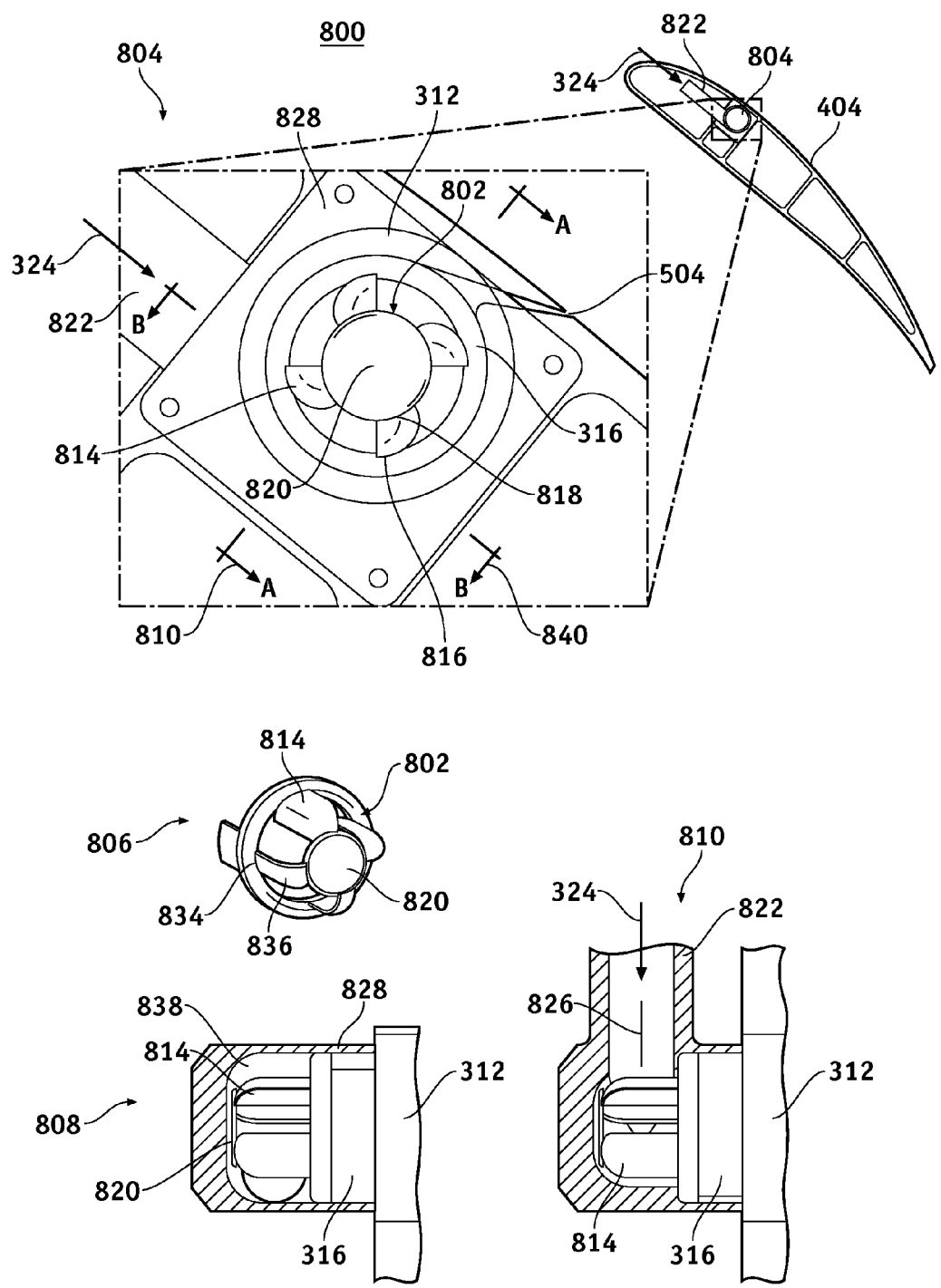
FIG. 8 is an illustration of various views of an exemplary fluidic traverse actuator comprising a tangential turbine according to an embodiment of the disclosure.

FIG. 8 is an illustration of various views 800 of an exemplary fluidic traverse actuator 310 comprising a tangential turbine 802 showing a side view 804, a sectional view 808 taken along a line A-A 810 of the side view 804, a sectional view 810 taken along a line B-B 840 of the side view 804 of the exemplary fluidic traverse actuator 310 and a perspective view 806 of the tangential turbine 802 according to an embodiment of the disclosure. The tangential turbine 802 is an embodiment of the turbine 320. The tangential turbine 802 comprises four turbine vanes 814. On one side (actuator side) the turbine vanes 814 are coupled to the inner cylinder 316 at a vane tip 816. Structure of the turbine vanes 814 is made rigid by attaching a vane root 818 of the turbine vanes 814 to a connecting disk 820. The tangential turbine 802 is encased within a housing 828.

The tangential turbine 802 comprises a tangential mechanism, whereby the airflow 324 is provided through an inlet 822 whose axis 826 is offset from the axis 308 (FIG. 3) of the inner cylinder 316. The airflow 324 impinges on the tangential turbine 802 in order to generate a torque needed to spin the inner cylinder 316. The turbine vanes 814 are shaped so that internal losses are small. In this manner, edges 834 closer to the inner cylinder 316 are straight while the edges 836 closer to the housing wall 838 are curved. The turbine vanes 814 so shaped ensure that the airflow 324 turns smoothly into the inner cylinder 316 when the inner cylinder 316 is spinning. In one embodiment, a self-rotating mechanism uses the airflow 324 to enable the spinning motion of the tangential turbine 802, in addition to the flow ejection for the flow control.

Figure 9:
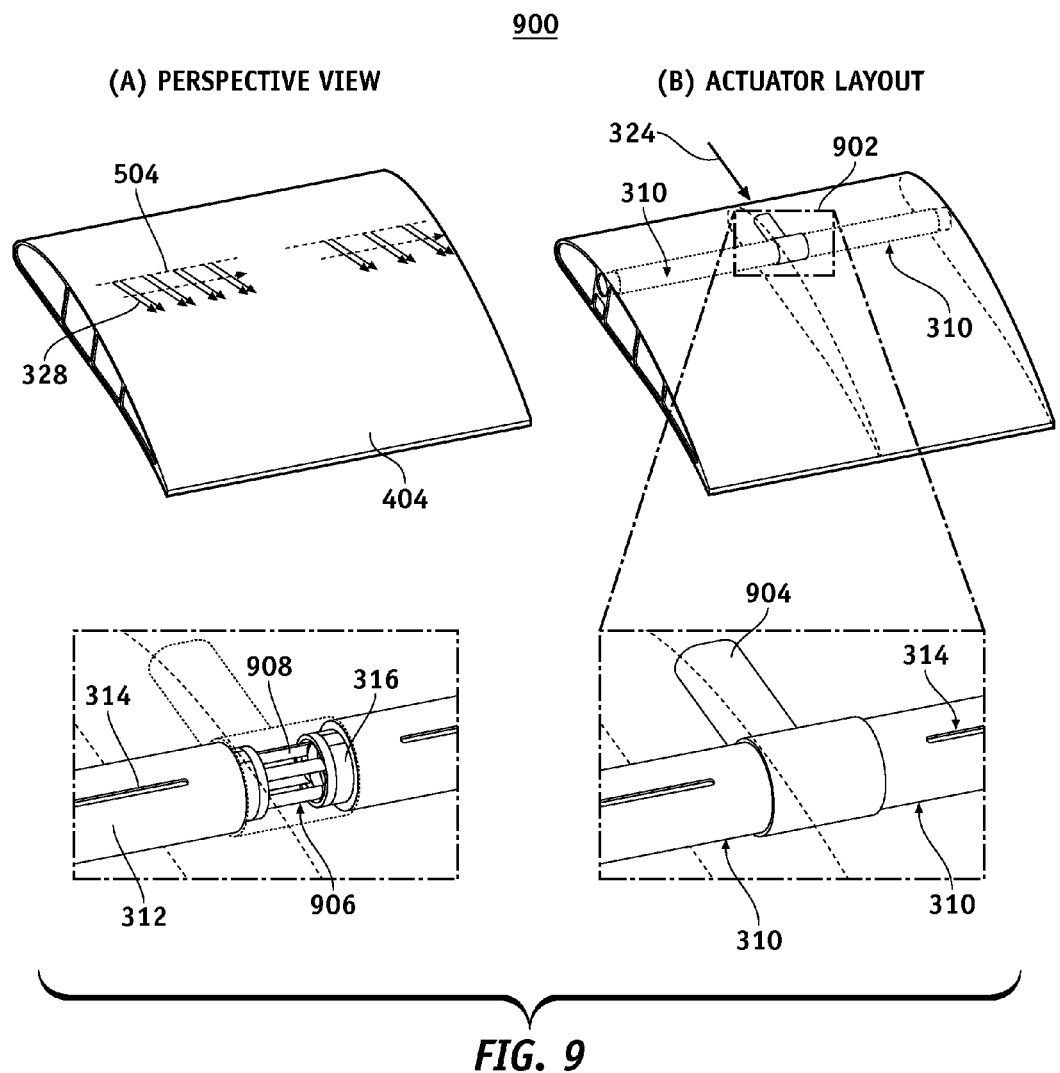
FIG. 9 is an illustration of a configuration showing an exemplary twin fluidic traverse actuator installed in a segment of a flap of a wing deployed during landing according to an embodiment of the disclosure.

FIG. 9 is an illustration of a perspective view A and an actuator layout B of a configuration 900 showing an exemplary twin fluidic traverse actuator 902 installed in a segment of the flap 404 of the wing 402 deployed during landing according to an embodiment of the disclosure. The twin fluidic traverse actuator 902 comprises two fluidic traverse actuators 310 supplied with a single central inlet such as an elongated inlet 904. The twin fluidic traverse actuator 902 incorporates the elongated inlet 904 and a single tangential turbine 906 coupled to the inner cylinder 316 of the twin fluidic traverse actuator 902. Turbine vanes 908 of the single tangential turbine 906 are longer than the turbine vanes 814 of the tangential turbine 802 and have no rounded edges.

Figure 10:
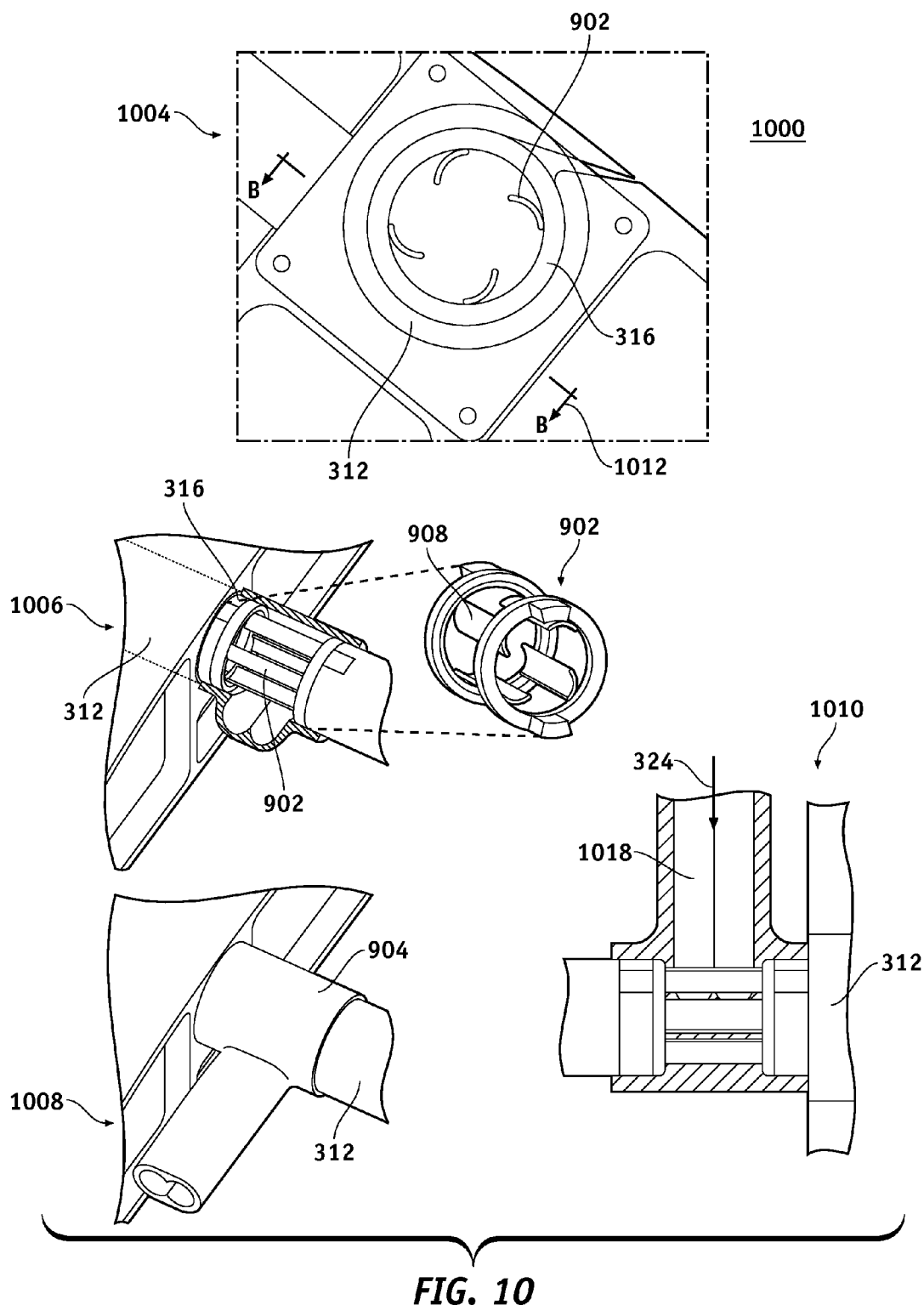
FIG. 10 is an illustration of various detail views of an exemplary twin fluidic traverse actuator of FIG. 9 according to an embodiment of the disclosure.

FIG. 10 is an illustration of various detail views 1000 of an exemplary twin fluidic traverse actuator 902 of FIG. 9 according to an embodiment of the disclosure. FIG. 10 shows a side view 1004, perspective views 1006 and 1008, and a sectional view 1010 taken along a line B-B 1012 of the side view 1004 of the fluidic traverse actuator 902.

Figure 11:
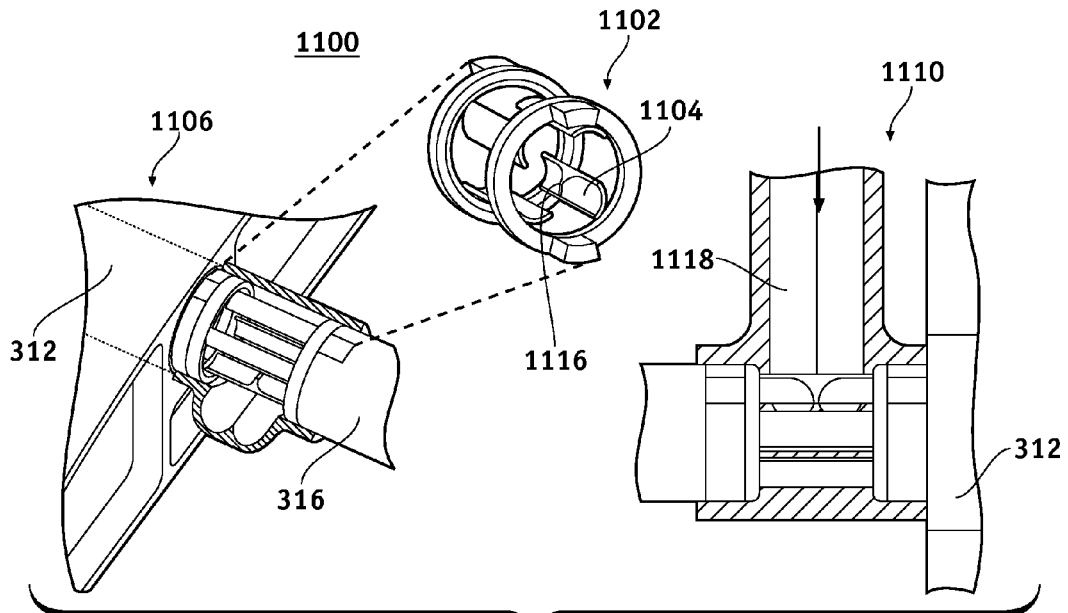
FIG. 11 is an illustration of various views of an exemplary twin fluidic traverse actuator of FIG. 9 comprising a split turbine according to an embodiment of the disclosure.

FIG. 11 is an illustration of various views 1100 of an exemplary twin fluidic traverse actuator 902 of FIG. 9 comprising a split twin turbine 1102. Two sides of each of split vanes 1104 are separated by a curved segment 1116 to ensure streamlined flow from the inlet 1118 to each of the fluidic traverse actuator 310 (FIG. 9) of the twin fluidic traverse actuator 902. Depending on an application, uneven flow distribution to each of the fluidic traverse actuator 310 can be obtained by properly placing the curved segment 1116 along the split vanes 1104.

FIG. 11 shows a perspective view 1106 and a sectional view 1110 taken along a line B-B 1012 of the side view 1004 of the twin fluidic traverse actuator 902 comprising the split twin turbine 1102.

Figure 12:
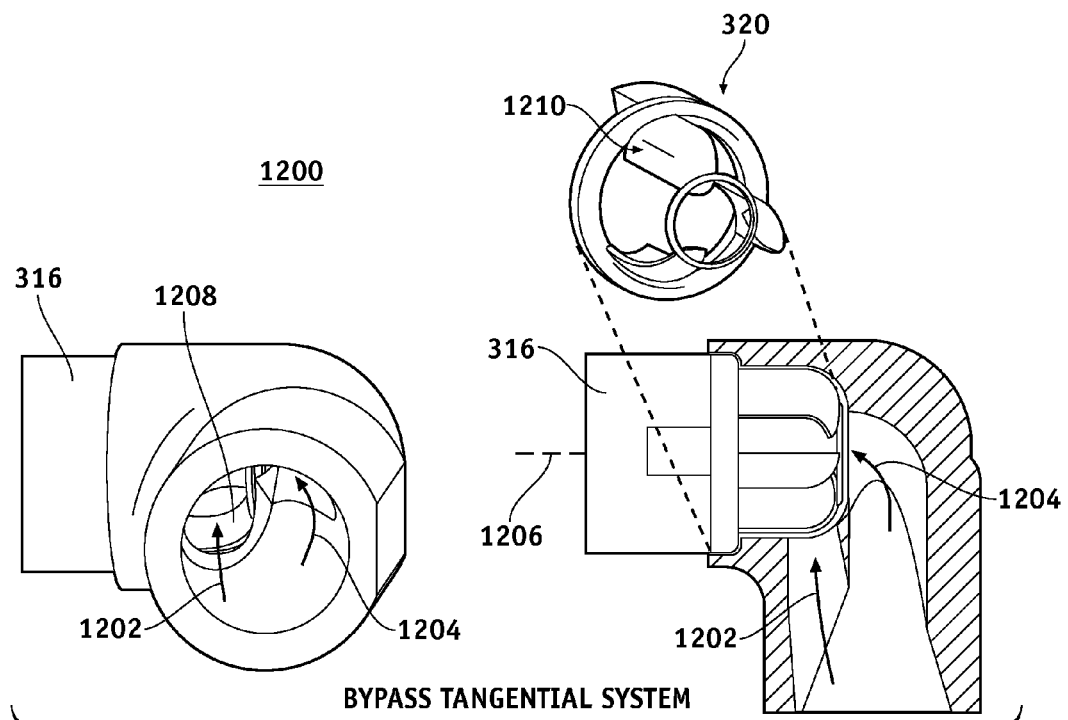
FIG. 12 is an illustration of an exemplary bypass tangential inlet system according to an embodiment of the disclosure.

FIG. 12 is an illustration of an exemplary bypass tangential inlet system 1200 according to an embodiment of the disclosure. The bypass tangential inlet system 1200 (fluid flow bypass) directs a bypass portion of the fluid flow around the turbine and reintegrate the bypass portion with the fluid flow in the inner cylinder. The inflow 324 (FIG. 10) is split into two streams comprising a small flow portion 1202 and a large flow portion 1204. The small flow portion 1202 of the inflow 324 is used to rotate the turbine 320 comprising the blades 1210 and the large flow portion 1204 is directed towards a center 1206 of the fluidic traverse actuator 310. The small flow portion 1202 and the large flow portion 1204 merge at an entrance 1208 to the inner cylinder 316 and subsequently ejected through the longitudinal slot 314 for flow control. This embodiment reduces losses by directing substantially only that portion of the inflow 324 necessary to create rotational motion.

Figure 13:
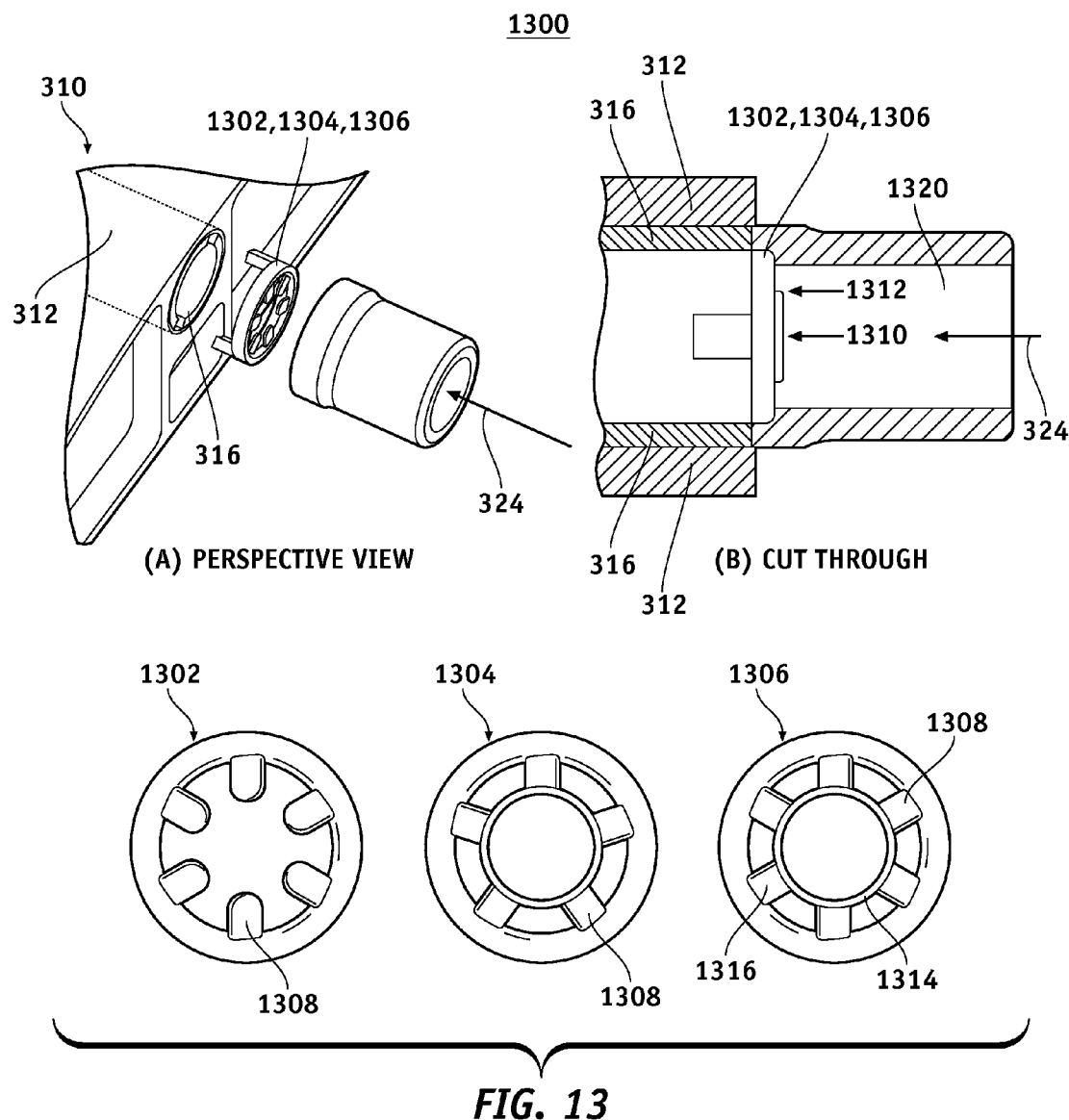
FIG. 13 is an illustration of the exemplary fluidic traverse actuator comprising an axial turbine according to an embodiment of the disclosure.

FIG. 13 is an illustration of a perspective view A and a cut trough view B of configuration 1300 of the exemplary fluidic traverse actuator 310 comprising an axial turbine 1302, 1304, or 1306 according to an embodiment of the disclosure. A set of radial turbine blades 1308 form a disc that is concentric to the inlet pipe 1320. The configuration 1300 might be advantageous in certain situations, depending on a layout of a space available for packaging of the fluidic traverse actuator 310 assembly. The inner portion 1310 of the incoming stream such as the airflow 324 flows directly towards the fluidic traverse actuator 310. The outer portion 1312 of the airflow 324 impinges on the turbine blades 1308 to provide the needed rotational torque. The turbine blades 1308 may be coupled via a circular element 1314 at tips 1316 for added rigidity. The axial turbine 1302, 1304 or 1306 can be designed for maximum efficiency by selecting the best combination of number of blades, blade chord, radial length and twist distribution. The axial turbine 1302, 1304, or 1306 may also comprise a series of disc elements.

Figure 14:
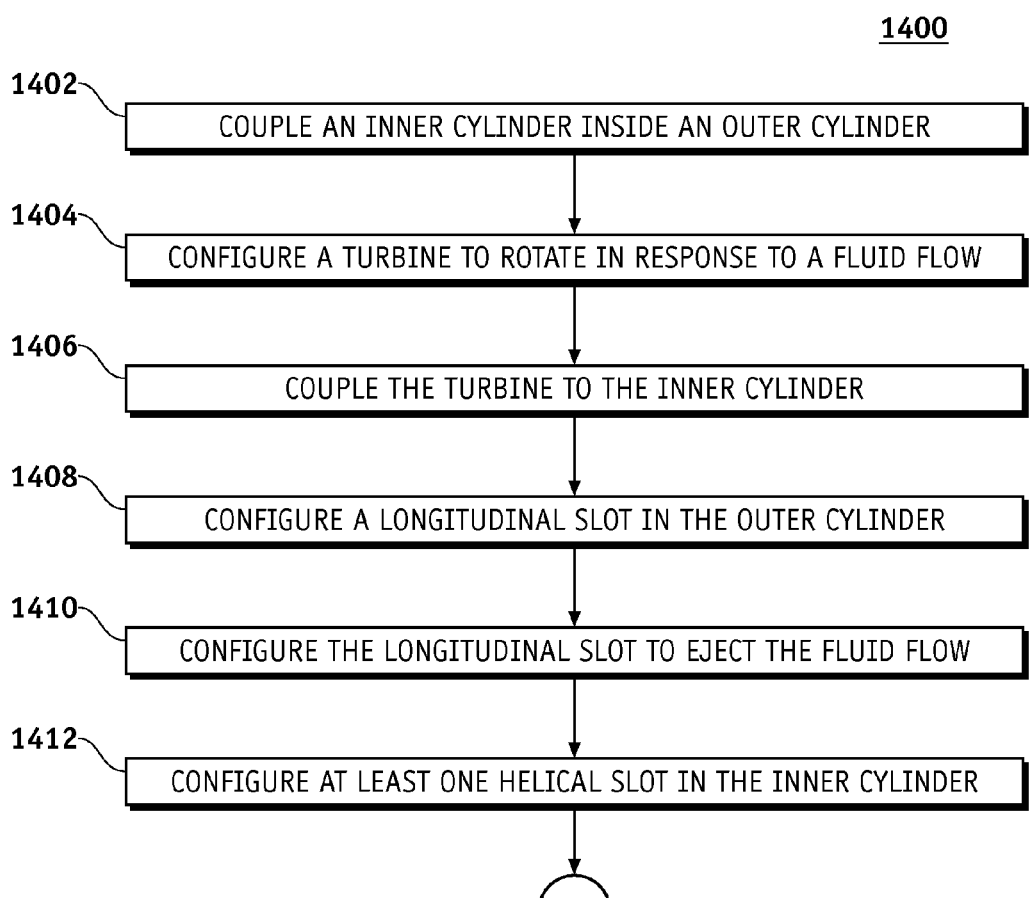
FIG. 14 is an illustration of an exemplary flowchart showing a process for configuring a self-rotating traverse actuator system according to an embodiment of the disclosure.
Figure 14:
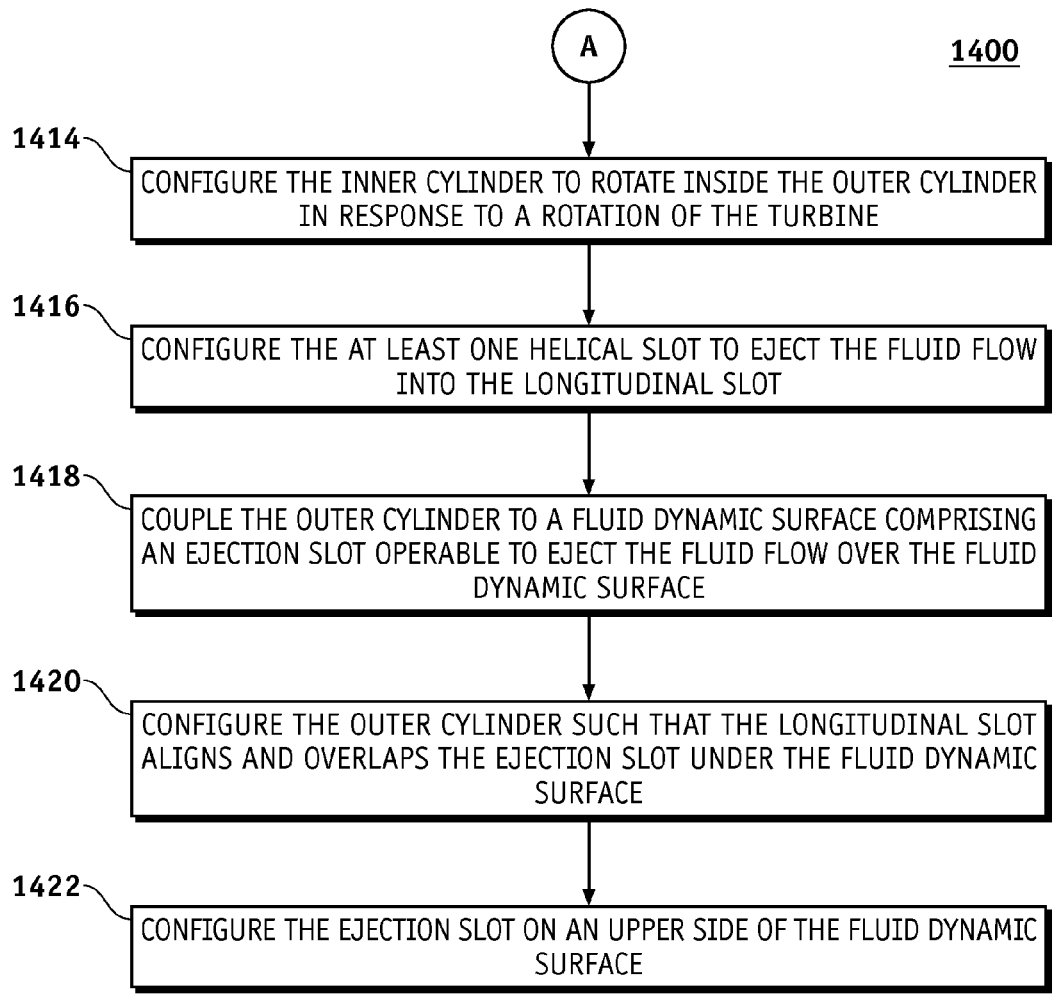

FIG. 14 is an illustration of an exemplary flowchart showing a process 1400 (process 1400) for configuring a self-rotating traverse actuator system according to an embodiment of the disclosure. The various tasks performed in connection with process 1400 may be performed mechanically, by software, hardware, firmware, computer-readable software, computer readable storage medium, or any combination thereof. It should be appreciated that process 1400 may include any number of additional or alternative tasks, the tasks shown in FIG. 14 need not be performed in the illustrated order, and the process 1400 may be incorporated into a more comprehensive procedure or process having additional functionality not described in detail herein.

For illustrative purposes, the following description of process 1400 may refer to elements mentioned above in connection with FIGS. 1-10. In some embodiments, portions of the process 1400 may be performed by different elements of the system 300 such as, the platform 302, the control surface 306, the fluidic traverse actuator 310, the turbine 320, the fluidic source 322 etc. It should be appreciated that process 1400 may include any number of additional or alternative tasks, the tasks shown in FIG. 14 need not be performed in the illustrated order, and the process 1400 may be incorporated into a more comprehensive procedure or process having additional functionality not described in detail herein.

Process 1400 may begin by coupling an inner cylinder such as the inner cylinder 316 inside an outer cylinder such as the outer cylinder 312 (task 1402).

Process 1400 may continue by configuring a turbine such as the turbine 320 to rotate in response to a fluid flow such as the airflow 324 (task 1404).

Process 1400 may continue by coupling the turbine 320 to the inner cylinder 316 (task 1406).

Process 1400 may continue by configuring a longitudinal slot such as the longitudinal slot 314 in the outer cylinder 312 (task 1408).

Process 1400 may continue by configuring the longitudinal slot 314 to eject the fluid flow (task 1410).

Process 1400 may continue by configuring at least one helical slot such as the helical slot 318 in the inner cylinder 316 (task 1412).

Process 1400 may continue by configuring the inner cylinder 316 to rotate inside the outer cylinder 312 in response to a rotation of the turbine 320 (task 1414).

Process 1400 may continue by configuring the at least one helical slot 318 to eject the fluid flow into the longitudinal slot 314 (task 1416).

Process 1400 may continue by coupling the outer cylinder 312 to a fluid dynamic surface such as the control surface 306 comprising an ejection slot such as the ejection slot 326 operable to eject the fluid flow over the fluid dynamic surface (task 1418).

Process 1400 may continue by configuring the outer cylinder 312 such that the longitudinal slot 314 aligns and overlaps the ejection slot 326 under the fluid dynamic surface (task 1420).

Process 1400 may continue by configuring the ejection slot on an upper side such as the upper surface 706 of the fluid dynamic surface (task 1422).

Figure 15:
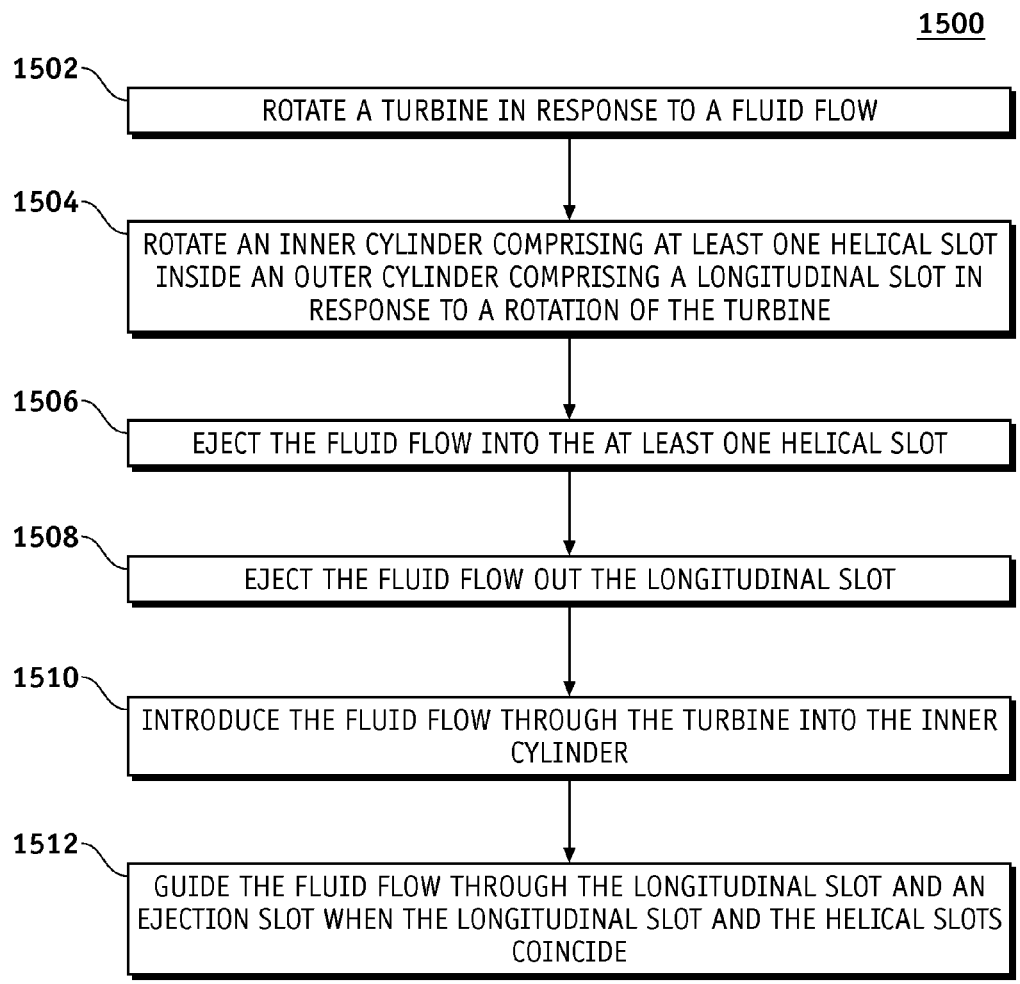
FIG. 15 is an illustration of an exemplary flowchart showing a process for operating a self-rotating traverse actuator system according to an embodiment of the disclosure.

FIG. 15 is an illustration of an exemplary flowchart showing a process 1500 for operating a fluidic traverse actuator system according to an embodiment of the disclosure. The various tasks performed in connection with process 1500 may be performed mechanically, by software, hardware, firmware, computer-readable software, computer readable storage medium, or any combination thereof. It should be appreciated that process 1500 may include any number of additional or alternative tasks, the tasks shown in FIG. 15 need not be performed in the illustrated order, and the process 1500 may be incorporated into a more comprehensive procedure or process having additional functionality not described in detail herein.

For illustrative purposes, the following description of process 1500 may refer to elements mentioned above in connection with FIGS. 1-10. In some embodiments, portions of the process 1500 may be performed by different elements of the system 300 such as: the platform 302, the control surface 306, the fluidic traverse actuator 310, the turbine 320, the fluidic source 322, etc. It should be appreciated that process 1500 may include any number of additional or alternative tasks, the tasks shown in FIG. 15 need not be performed in the illustrated order, and the process 1500 may be incorporated into a more comprehensive procedure or process having additional functionality not described in detail herein.

Process 1500 may begin by rotating a turbine such as the turbine 320 in response to a fluid flow such as the airflow 324 (task 1502).

Process 1500 may continue by rotating an inner cylinder such as the inner cylinder 316 comprising at least one helical slot such as the helical slot 318 inside an outer cylinder such as the outer cylinder 312 comprising a longitudinal slot such as the longitudinal slot 314 in response to a rotation of the turbine 320 (task 1504).

Process 1500 may continue by ejecting the fluid flow into the at least one helical slot 318 (task 1506).

Process 1500 may continue by ejecting the fluid flow out the longitudinal slot 314 (task 1508).

Process 1500 may begin by introducing the fluid flow through the turbine 320 into the inner cylinder 316 (task 1510).

Process 1500 may continue by guiding the fluid flow through the longitudinal slot 314 and an ejection slot such as the ejection slot 326 when the longitudinal slot 314 and the helical slots 318 coincide (task 1512).

Figure 16:
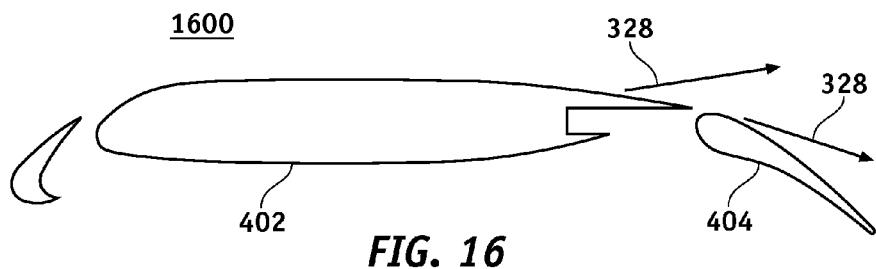
FIG. 16 is an illustration of a cross-sectional view of a platform according to an embodiment of the disclosure.

FIG. 16 is an illustration of a cross-sectional view 1600 of the platform 302 such as the wing 402 in FIG. 6 according to an embodiment of the disclosure. The air jet 328 flows in a stream-wise direction, such as the stream-wise direction 332 in FIG. 3 and flows out of the wing ejection slots 602 in the wing 402 and out of the flap ejection slot 504 of the flap 404.

Figure 17:
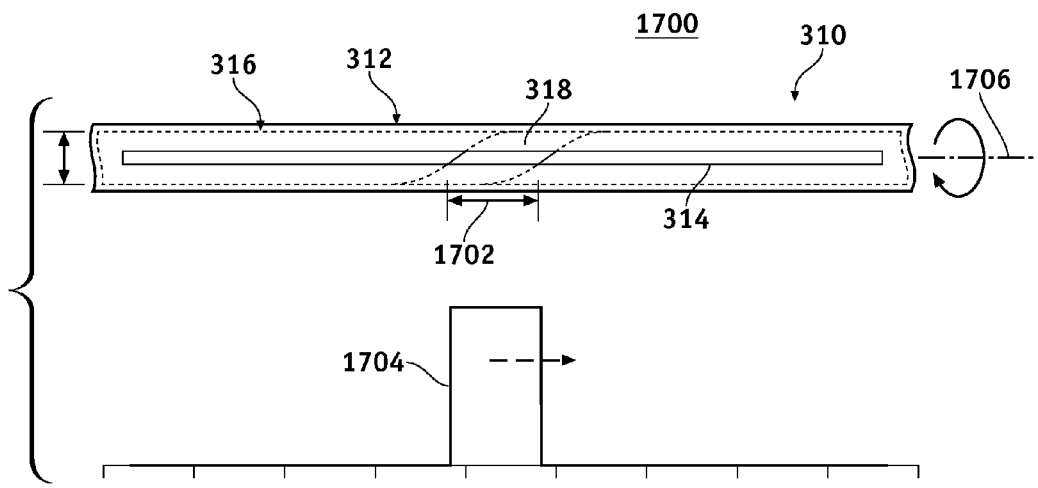
FIGS. 17 and 18 are illustrations of actuation modes of a self-rotating fluidic traverse actuator according to an embodiment of the disclosure.
Figure 18:
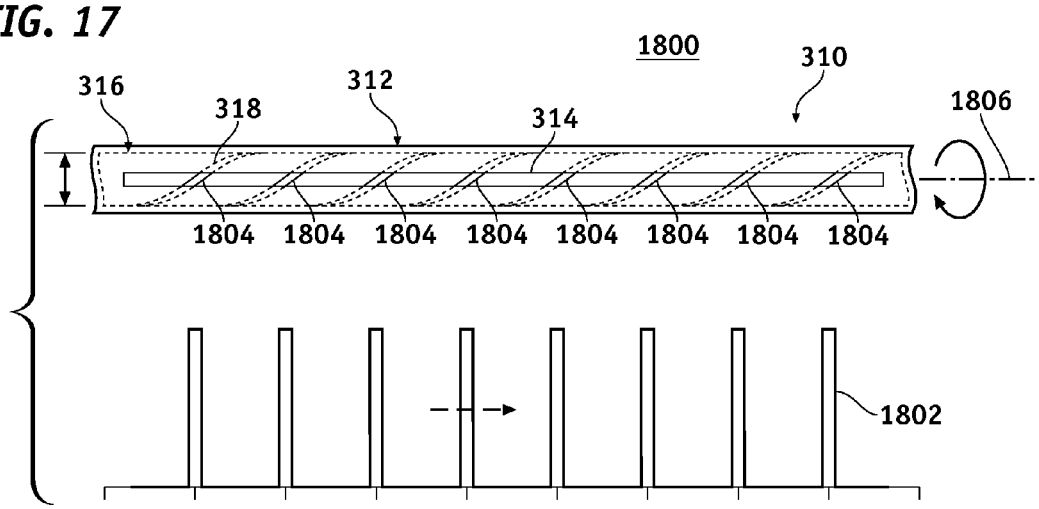

FIGS. 17 and 18 are illustrations of actuation modes 1700 and 1800 of the fluidic traverse actuator 310 according to an embodiment of the disclosure. FIGS. 17 and 18 illustrate a top view of the fluidic traverse actuator 310. The width of the air jet 328 is defined by the width of the longitudinal slot 314 of the outer cylinder 312. Air jet length is defined by the overlap of helical slots 318 of inner cylinder 316 with the longitudinal slot 314 of the outer cylinder 312.

FIG. 17 is an illustration of an actuation mode for overlap 1702, which is about one-eighth the length of the fluidic traverse actuator 310. The periodic motion of air jet 1704 depends on the rotational speed of inner cylinder 316. For the helical slot 318, the frequency of actuation corresponds to the rotational frequency of inner cylinder 316. Thus, the amount of airflow for air jet 1704 is about one-eighth the amount of airflow for constant blowing over the distance of the fluidic traverse actuator 310, for a given constant airflow speed. The overlap of helical slot 318 of inner cylinder 316 with the longitudinal slot 314 of outer cylinder 312 forms an overlap 1702. As inner cylinder 316 continues to rotate, air jet 1704 moves in a periodic motion along axis 1706.

FIG. 18 is an illustration of an actuation mode where the air jet 1704 is divided into number of air jets 1802. In this example, the helical slot 318 is more tightly wound than helical slot 318 in FIG. 17. The helical slot 318 in FIG. 18 forms eight overlapping sections 1804 with the longitudinal slot 314 over the length of fluidic traverse actuator 310. Each overlapping section 1804 is about one-eighth the length of overlap 1702 in FIG. 17. In this example, number of air jets 1802 has the same amount of airflow as air jet 1704 in FIG. 17. Thus, the air jet 1704 in FIG. 17 is effectively split into eight air jets. As the inner cylinder 316 continues to rotate, number of the air jets 1802 moves in a periodic motion along axis 1806.

In these illustrative examples, a number of actuation modes may be used to increase lift. The parameters of the actuation mode will be selected to best meet the design targets and goals of the particular application. An actuation mode refers to a set of device parameters that are used to obtain desired results. For example, one actuation mode may produce one air jet that is about one eighth the length of the actuation unit. Another actuation mode may produce sixteen individual air jets that as a whole are about one-sixteenth the length of the entire air jet.

Other actuation modes may vary the pressure of the air supplied in combination with varying the length and number of the air jets. Still other actuation modes may vary the speed that the air jets move across the control surface through the rotational speed of the inner element, in combination with varying the length and number of the air jets. Still yet other actuation modes may synchronize the movement of the number of air jets across a number of actuation units.

The illustration of different actuation modes described in FIGS. 17 and 18 are not an exhaustive combination of actuation modes. Different embodiments may be implemented using different overlap lengths, numbers of air jets, and actuation unit lengths without departing from the scope of the present disclosure. For example, in some embodiments, sixteen air jets may be created, each air jet having a length of about one-sixteenth that of air jet 1704 in FIG. 17. In some embodiments, a number of actuation units may be used. The number of fluidic traverse actuator 310 may have a number of air jets that may or may not be synchronized together to produce desired effects.

Figure 19:
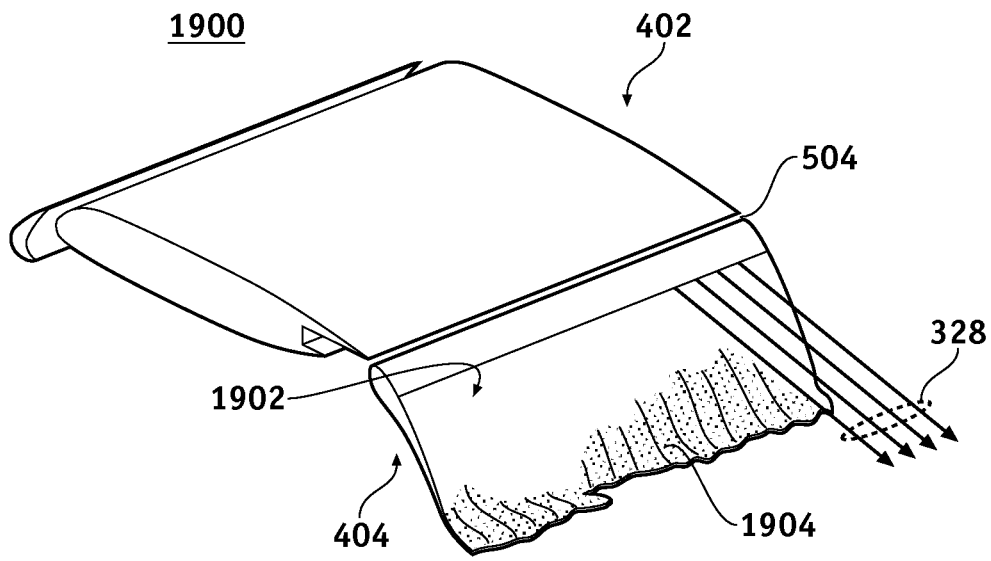
FIGS. 19-22, are illustrations of a traversing air jet on a section of a wing of an aircraft according to an embodiment of the disclosure.
Figure 20:
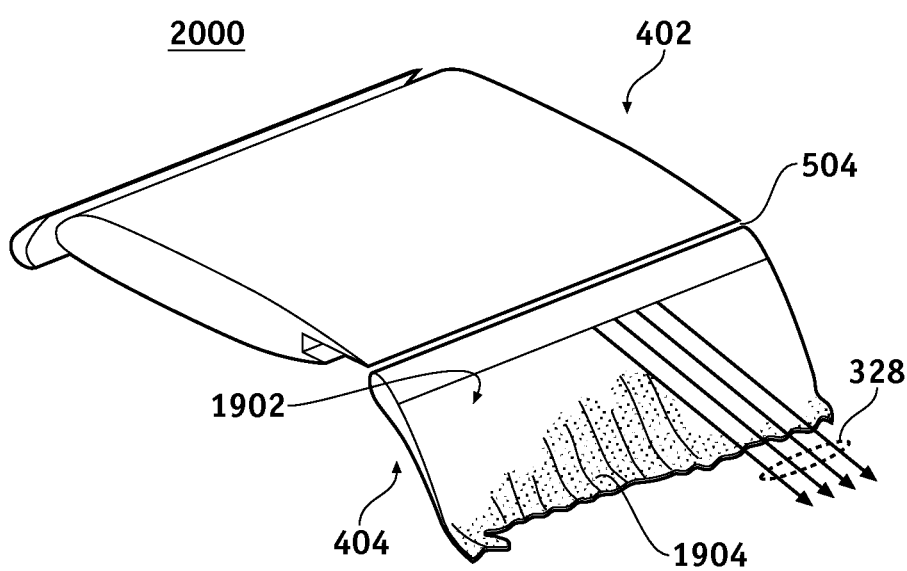
Figure 21:
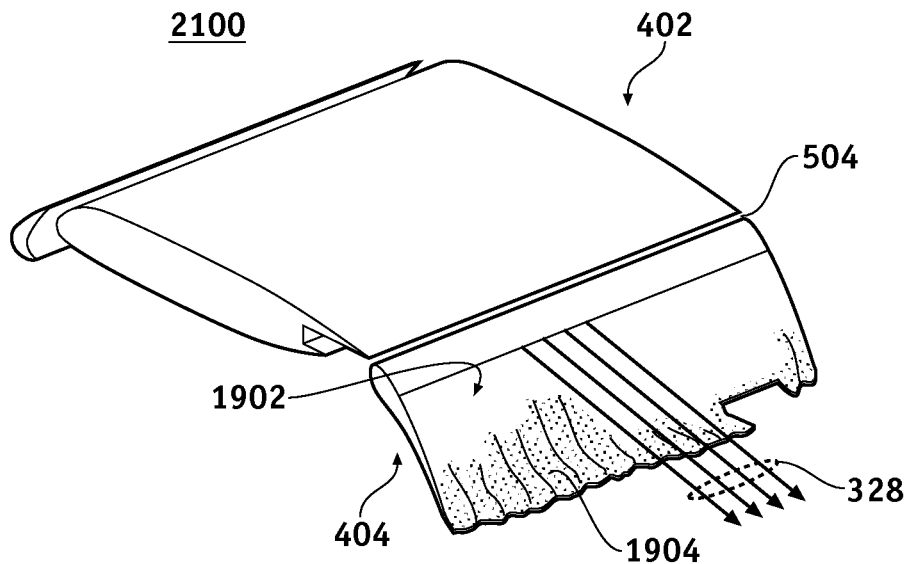
Figure 22:
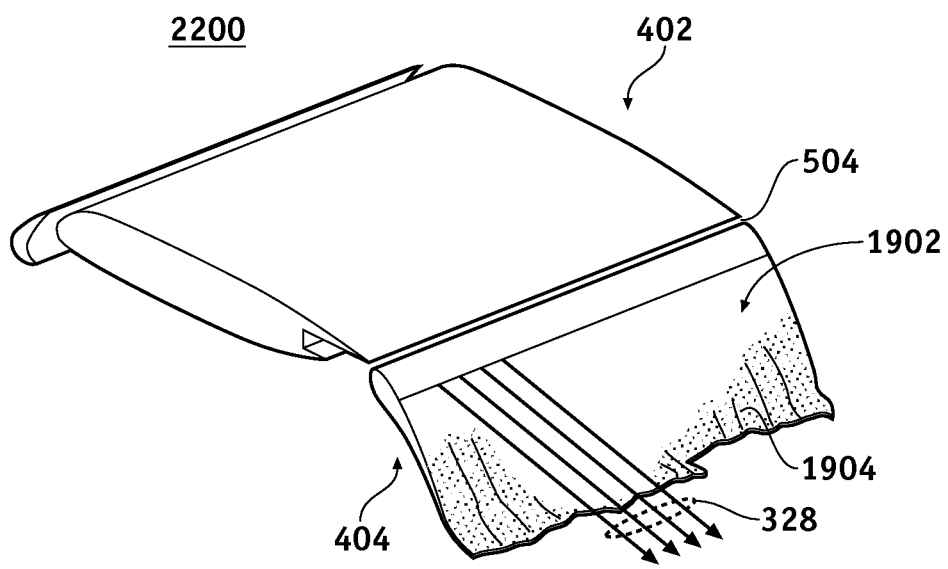

FIGS. 19-22, are illustrations of a traversing air jet on a section of a wing of an aircraft according to an embodiment of the disclosure. FIG. 19 illustrates the air jet 328 flowing through a slot in the flap 404, such as the flap ejection slot 504 in FIG. 5. In these depicted examples, the air jet 328 produces area of attachment 1902 above the flap 404. Instantaneous flow separation pocket 1904 is also shown.

The air jet 328 traverses across the flap 404 at successive time intervals.

The air jet 328 traverses across the flap 404 in a periodic motion. A speed of traversing air jet is controlled by a frequency of rotation of the inner cylinder 316 in FIG. 3. The air jet 328 moves along the flap 404 the effects created by area of attachment 1902 linger even after the air jet 328 has passed. This lingering of area of attachment 1902 reduces the amount of instantaneous flow separation pocket 1904 above the flap 404. Thus, an amount of lift generated is increased while an amount of actuation needed to generate the lift is decreased.

As shown in these examples, FIGS. 19-22 provide an illustration of a single traversing air jet for a given wing section length, such as the air jet 1704 in FIG. 17 as discussed above. Additionally, the air jet 328 may be split into a number of air jets that traverse the wing section, such as number of the air jets 1802 in FIG. 18 as discussed above.

In this manner, the embodiments of the disclosure provide various means for configuring a self-rotating fluidic traverse actuator which uses an turbine instead of an electric motor for actuation. Using the turbine makes implementation of the self-rotating fluidic traverse actuator system very simple. Compared to the existing systems, the turbine comprises several advantages such as, but without limitation: having lower weight, not requiring a power source, eliminating possible lightning strike hazard, simplifying entire actuation mechanism due to fewer parts, reducing a risk of leakage, lowering maintenance, and other advantages.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 2-13 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A self-rotating fluidic traverse actuator for an aircraft comprising:
   a turbine operable to rotate in response to a fluid flow;
   an outer cylinder comprising a longitudinal slot operable to eject the fluid flow; and
   an inner cylinder operable to rotate inside the outer cylinder in response to a rotation of the turbine,
   wherein the turbine is operable to introduce the fluid flow into the inner cylinder, and
   wherein the inner cylinder comprises at least one helical slot operable to eject the fluid flow into the longitudinal slot.

2. The self-rotating fluidic traverse actuator of claim 1, further comprising a fluid dynamic surface comprising an ejection slot coupled to the outer cylinder and operable to eject the fluid flow over the fluid dynamic surface.

3. The self-rotating fluidic traverse actuator of claim 2, wherein the at least one helical slot induces a periodical fluid flow sweep on the fluid dynamic surface.

4. The self-rotating fluidic traverse actuator of claim 1, wherein the turbine comprises an axial turbine with a plurality of radial turbine blades.

5. The self-rotating fluidic traverse actuator of claim 1, wherein the turbine comprises one of: an axial turbine, a split turbine, a tangential turbine, a circumferential turbine, a combination manifolded axial/circumferential turbine, a helical turbine, and inward-oriented ribs running a length of the inner cylinder.

6. The self-rotating fluidic traverse actuator of claim 1, further comprising a fluid flow bypass operable:
to direct a bypass portion of the fluid flow around the turbine; and
reintegrate the bypass portion with the fluid flow in the inner cylinder.

7. The self-rotating fluidic traverse actuator of claim 6, wherein the turbine comprises the fluid flow bypass.

8. The self-rotating fluidic traverse actuator of claim 1, further comprising:
a second outer cylinder comprising a second longitudinal slot operable to eject the fluid flow; and
a second inner cylinder operable to rotate inside the second outer cylinder in response to a rotation of the turbine and comprising at least one second helical slot operable to eject the fluid flow into the second longitudinal slot.

9. The self-rotating fluidic traverse actuator of claim 1, wherein the helical slot comprises substantially of one or more full revolutions around the inner cylinder.

10. A method for configuring a self-rotating fluidic traverse actuator for an aircraft, the method comprising:
configuring a turbine to rotate in response to a fluid flow;
configuring a longitudinal slot in an outer cylinder;
configuring the longitudinal slot to eject the fluid flow;
configuring at least one helical slot in an inner cylinder;
configuring the inner cylinder to rotate inside the outer cylinder in response to a rotation of the turbine, wherein the turbine is configured to introduce the fluid flow into the inner cylinder; and
configuring the at least one helical slot to eject the fluid flow into the longitudinal slot.

11. The method of claim 10, further comprising coupling the inner cylinder inside the outer cylinder.

12. The method of claim 10, further comprising coupling the outer cylinder to a fluid dynamic surface comprising an ejection slot operable to eject the fluid flow over the fluid dynamic surface.

13. The method of claim 12, further comprising configuring the outer cylinder such that the longitudinal slot aligns and overlaps the ejection slot under the fluid dynamic surface.

14. The method of claim 12, further comprising configuring the ejection slot on an upper side of the fluid dynamic surface.

15. The method of claim 10, further comprising coupling the turbine to the inner cylinder.

16. A method for operating a self-rotating fluidic traverse actuator for an aircraft, the method comprising:
rotating a turbine in response to a fluid flow;
rotating an inner cylinder comprising at least one helical slot inside an outer cylinder comprising a longitudinal slot in response to a rotation of the turbine;
introducing the fluid flow through the turbine into the inner cylinder;
ejecting the fluid flow into the at least one helical slot; and
ejecting the fluid flow out the longitudinal slot.

17. The method of claim 16, further comprising guiding the fluid flow through the longitudinal slot and an ejection slot when the longitudinal slot and the at least one helical slot coincide.

18. The method of claim 16, further comprising:
directing a bypass portion of the fluid flow around the turbine via a fluid flow bypass; and
reintegrating the bypass portion with the fluid flow in the inner cylinder.

19. The method of claim 18, wherein the turbine comprises the fluid flow bypass.

20. The self-rotating fluidic traverse actuator of claim 1, wherein the turbine comprises a split turbine.

* * * * *